Oct. 5, 1971   C. P. MIES, JR., ET AL   3,610,133
APPARATUS FOR COOKING CHICKEN

Filed May 14, 1969   9 Sheets-Sheet 9

FIG.17

INVENTORS
CARL P. MIES, JR.
WINSTON L. SHELTON
BY
Mann, Brown & McWilliams
ATTORNEYS United States Patent Office 3,610,133
Patented Oct. 5, 1971

3,610,133
APPARATUS FOR COOKING CHICKEN
Carl P. Mies, Jr., Louisville, and Winston L. Shelton, Jeffersontown, Ky., assignors to Mies Filter Products, Incorporated
Filed May 14, 1969, Ser. No. 824,430
Int. Cl. A47j 37/12
U.S. Cl. 99—337     24 Claims

ABSTRACT OF THE DISCLOSURE

The disclosure pertains to a deep fat fryer and a method of cooking chicken using same in which the chicken and cooking oil are employed in a ratio on the order of one to two, respectively, and are placed in a smooth walled generally cylindrical chamber of the fryer with the fryer being provided with band type electric heaters adjacent to but spaced from the lower end of the chamber and outside of same that establish a convection flow in the cooking oil which rises adjacent the chamber wall and falls adjacent the mid portion of the chamber. The chicken is applied to the chamber in a basket that seats on the chamber bottom above the special filter unit that also seats on the chamber bottom in a relatively cool area of the chamber. The chamber is closed by a cover hinge at one edge of the chamber and is clamped in place for cooking under pressure conditions. The cover hinge includes a lost motion arrangement so that when the cover clamping means is released, the cover seal is partially released so that fluids under pressure within the fryer escape in a direction away from the operator. The fryer includes a drain at the bottom of its chamber through which the cooking oil may be periodically drained under pressure through the filter unit to separate out the solids, after which the filtered cooking oil is returned to the chamber with enough new cooking oil to restore the original volume thereof. Associated with the cover is a novel pressure regulator that limits the pressure build up within the fryer, providing for both automatic and manual release of same, and directs release of fluids under pressure away from the operator.

---

This application discloses important aspects of the method disclosed in the copending application of Carl P. Mies, Jr., Ser. No. 24,517, filed Apr. 1, 1970, and assigned to the assignee of the instant application.

This invention relates to an apparatus for cooking chicken, and more particularly, to an apparatus for deep fat frying chicken cookery.

Cookers for deep fat frying of chicken and the like on a mass basis have developed into comparatively complex mechanisms requiring careful operation by trained personnel for best results as well as personnel safety. Furthermore, cooking oil requirements have proved to be a significant problem from cost and handling standpoints in terms of solids removal and oil replacement in the furtherance of efforts to provide a consistenly good product that avoids digestive problems.

A principal object of this invention is to provide an apparatus for cooking chicken which not only provides a consistently good product under low pressure conditions, but which also provides multiple use of the same cooking oil charge without adversely affecting quality.

Another principal object of the invention is to provide a deep fat fryer that is safe and easy to operate by unskilled help, and that reduces chicken cookery on a mass basis to a few simple steps which will consistently provide a high quality product.

Other objects of the invention are to provide a deep fat cooking chamber and heating arrangement therefor that avoid charring of solids, to provide a cooking oil drainage arrangement filter unit therefor that permits periodic filtering and re-use of the cooking oil, to provide a safety cover arrangement that protects the operator and makes for easy pressure regulation, and to provide a deep fat fryer that is economical to manufacture, convenient and efficient in use, and long lived in operation.

In accordance with this invention, deep fat frying of the chicken is done on the basis of one pound of chicken to about two pounds of cooking oil or fat, with the oil being first preheated to about 400 degrees F. under atmospheric conditions, during the course of which the heat is turned off, the chicken then being deposited in the fryer and cooked with the cover open until it is browned to a cornflake color, whereupon the fryer is sealed for pressure cooking for about 12 minutes, during which period the temperature of the cooking oil drops to about 250 degrees F., and no additional heat is applied until the last few minutes (if necessary). The resulting high quality product is removed from the cooking chamber for serving or temporary storage, and another batch of chicken may be applied to the fryer in the same cooking oil, whereupon the cooking procedure is repeated. After about six batches, the cooking oil is drained through a special filter unit under pressure, which removes the solids from the cooking oil, and then is reapplied to the fryer together with sufficient make-up cooking oil to restore the cooking oil to its original volume. Additional batches are prepared in like manner using the same cooking oil or fat charge, cleaned and replenished as indicated, until the charge of cooking oil has broken down, whereupon a new cooking oil charge is started.

Other objects, uses, and advantages will be obvious or become apparent from a consideration of the following detailed description and the application drawings in which like reference numerals indicate like parts throughout the several views.

However, it is to be understood that the specific drawing illustrations provided are supplied primarily to comply with the requirements of the patent code, and that the invention may have other specific embodiments that are intended to be covered by the appended claims.

GENERAL DESCRIPTION

Reference numeral 10 of FIGS. 1–5 generally indicates a commercialized embodiment of the invention which comprises a vessel 12 (see FIGS. 3 and 4) mounted in a suitable housing and supporting structure 14 that is incorporated in a suitable cabinet 16 which houses the vessel 12 and its associated components.

The vessel 12 is generally cylindrical in configuration and comprises a cylindrical side wall 18 merging into a frustoconical bottom wall 20, which together define a smooth walled cooking or frying compartment 22 that is free of any and all protuberances, recesses, and the like that could form a trap or lodge place for solids.

Figure 2:
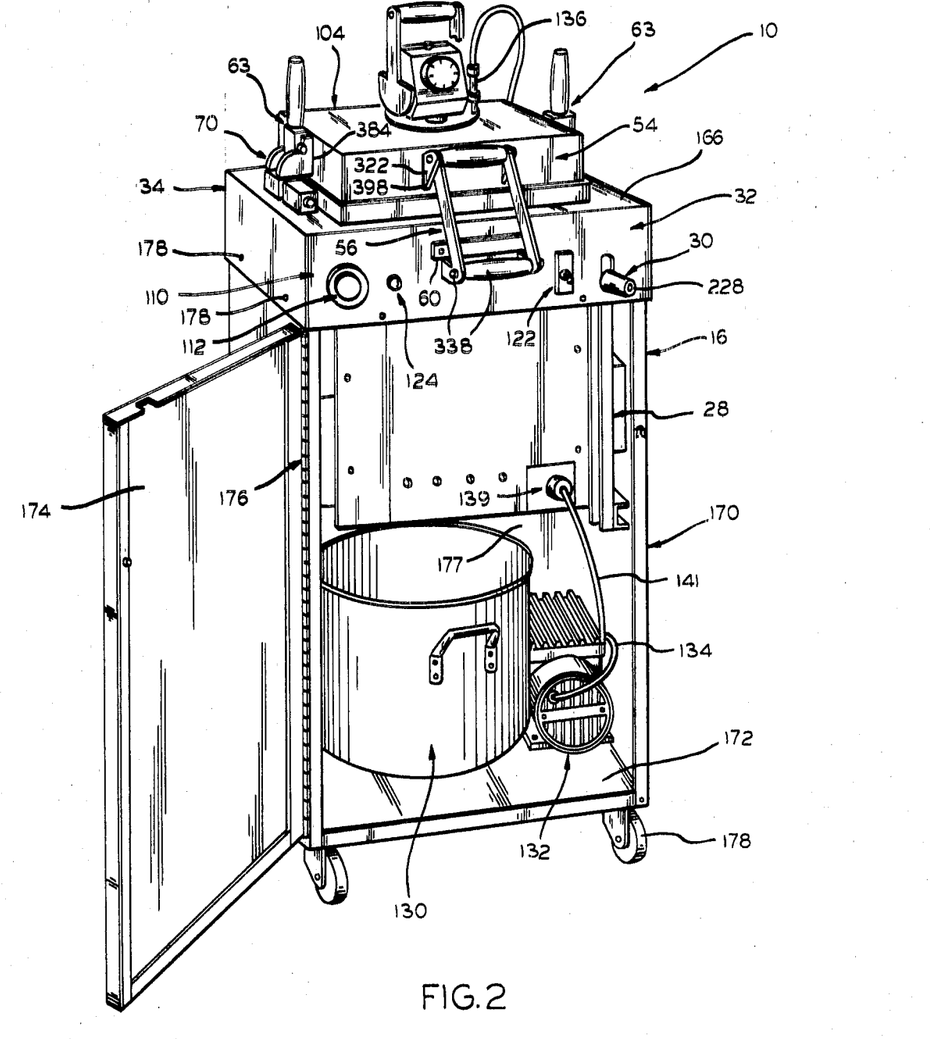
FIG. 2 is a view similar to that of FIG. 1 but showing the interior of the cabinet of which the cooker of the illustrated embodiment forms a part and several pieces of associated equipment that are involved in same.
Figure 3:
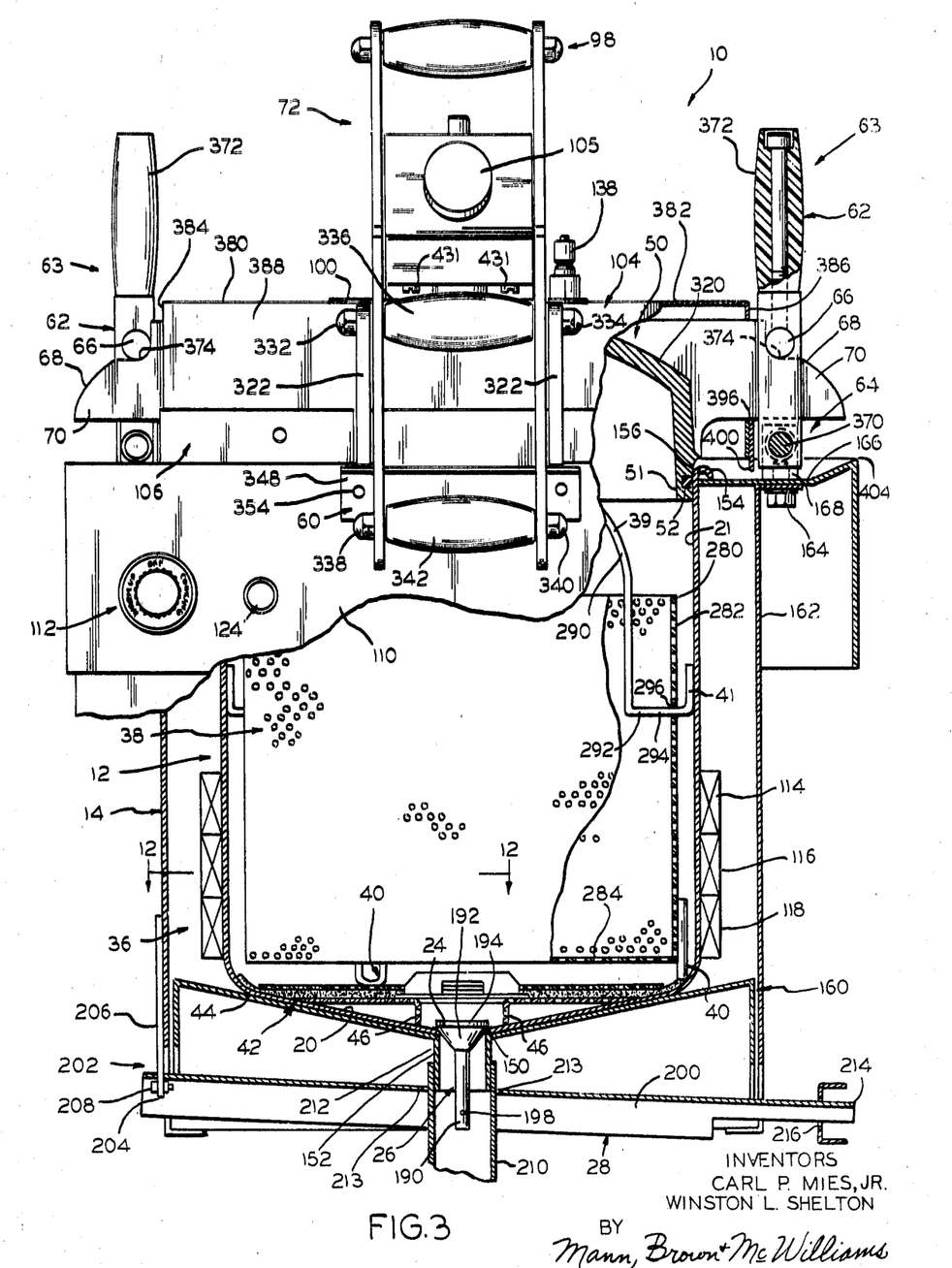
FIG. 3 is a front elevational view of the upper portion of the fryer, with parts being broken away to expose other parts.
Figure 4:
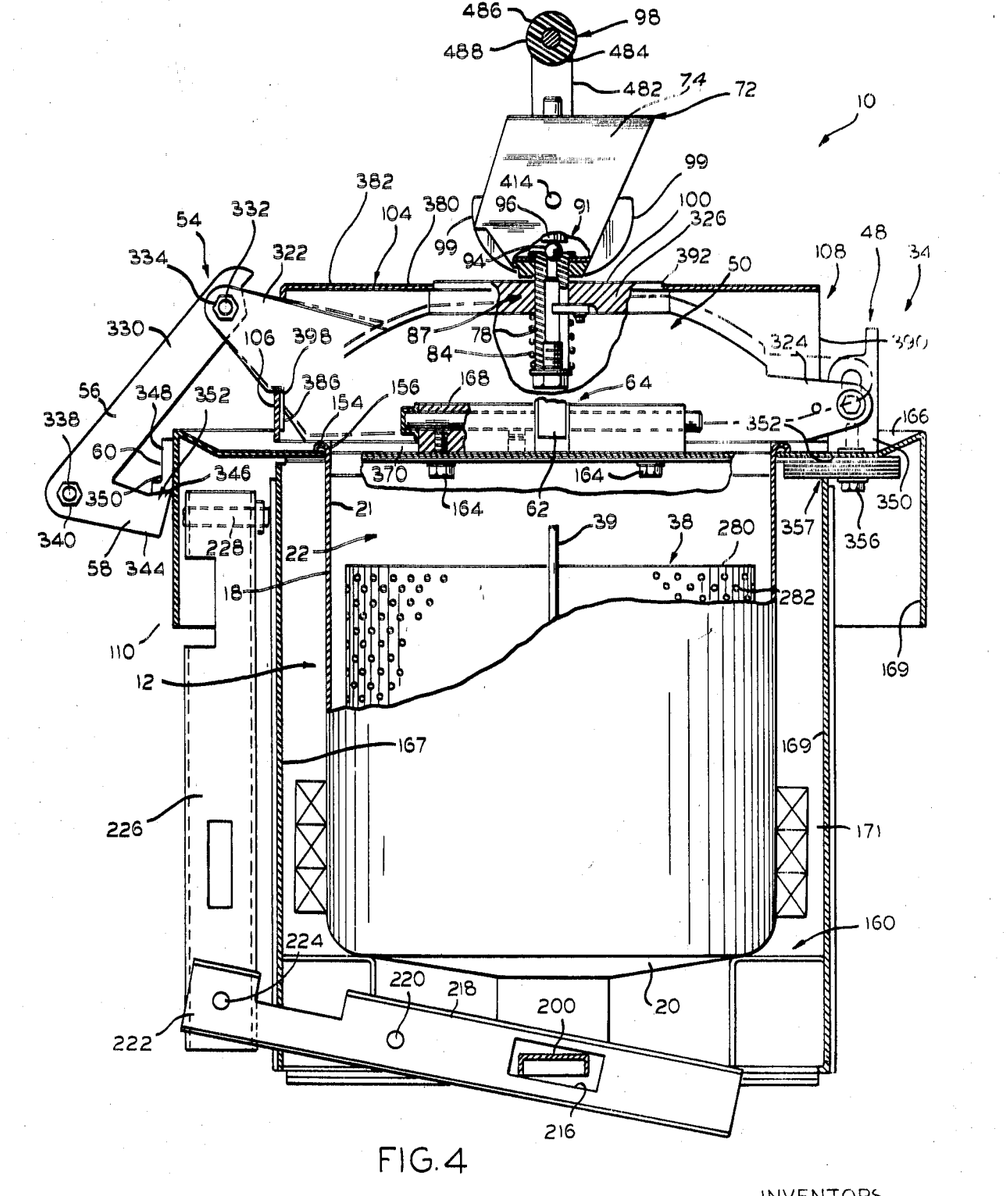
FIG. 4 is a side elevational view of the upper portion of the fryer, with parts being shown in section and other parts being broken away to expose interior components.

The bottom wall 20 of the vessel defines an outlet 24 (see FIG. 3) for draining cooking oil therefrom, fluid flow through which is controlled by a valve device 26 that is raised and lowered through operating linkage 28 that is in turn controlled by a handle 30 at the front side 32 of the fryer 10, as distinguished from its rear side 34 (see FIGS. 2 and 4).

Figure 5:
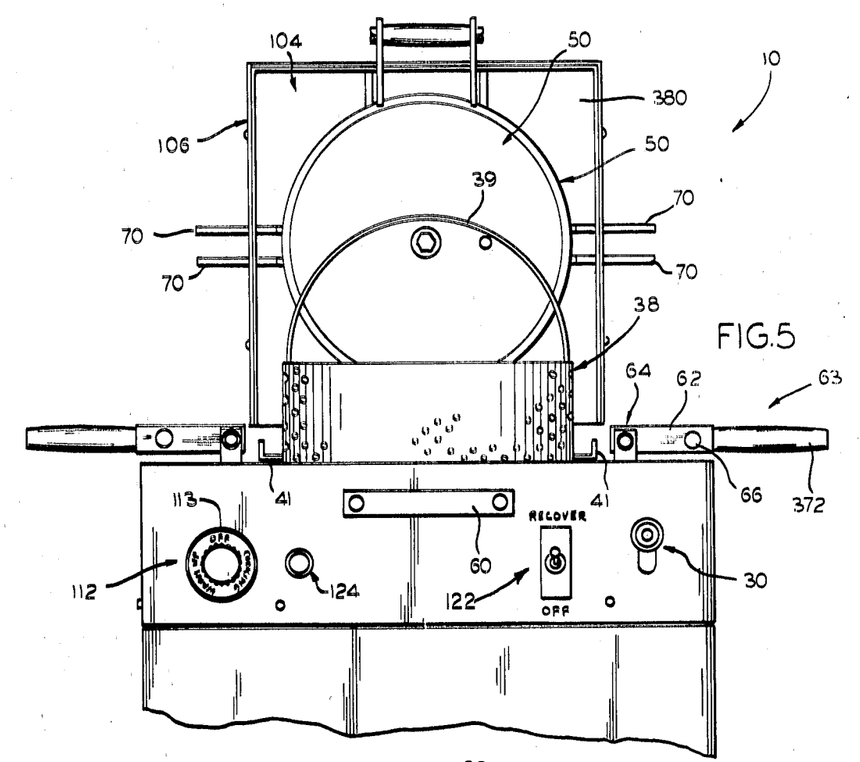
FIG. 5 is a view similar to that of FIG. 3 but entirely in elevation and showing the fryer opened up and the chicken receiving basket seated above the cooking chamber to permit cooking oil to drain therefrom back into the chamber.

The vessel 12 is heated by heater device 36 (see FIGS. 3 and 12), and chicken to be cooked is placed within the vessel 12 in a basket structure 38 that includes legs 40 for supporting same on the bottom of the vessel 12 and a handle 39 for manipulating the basket, which handle 39 in accordance with this invention is arranged to have extensible and retractable end portions 41 (compare FIGS. 3 and 5). Interposed between the basket 38 and the bottom wall 20 of the vessel 12 is a filter device 42 that rests on the vessel bottom wall 20 at its rim 44 and engages the vessel bottom wall 20 adjacent drain outlet 24 through legs or projections 46.

Pivotally connected to the housing structure 14 by special hinge structure 48 (see FIGS. 4, 9 and 10) is a cover 50 that includes about its rim 51 a seal 52 (see FIG. 3) proportioned for sealing engagement with the internal wall surface 21 of vessel 12 in the closed position of the cover 50. Associated with the cover 50 is a catch device 54 at the front 32 of the fryer 10 comprising a swing arm structure 56 formed with catch shoulders 58 to cooperate with a catch element 60 fixed to housing structure 14.

On either side of the cover 50 are cam locks 63 comprising hold down swing arms 62 pivotally connected as at 64 to the housing structure 14 and carrying rollers 66 for camming cooperation with cam surfaces 68 of the spaced flanges 70 that are formed on either side of the cover 50.

The cover 50 carries a novel pressure regulator unit 72 which controls the maximum pressure that can be generated within the vessel 12 during the frying operation.

The pressure regulator unit 72 (see FIGS. 7 and 8) is fully disclosed in Winston L. Shelton application Ser. No. 824,431, filed May 14, 1969 (the disclosure of which is incorporated herein by this reference). It generally comprises a valve body structure 74 mounted on a stem 78 that is formed with a central passage 80, and that is slidably mounted within opening 82 formed in the cover 50 such that compression spring 84 that biases the stem inwardly of the cover will seat annular seat 86 of valve body 74 against O-ring seal 88 that is received about stem 78, which seal 88 is in turn seated against annular seat 89 that is formed in cover 50 to form a relief valve 87. The passage 80 of stem 78 terminates in an outlet port 90 defining a seat 92 on which is positioned a ball member 94 that serves to close off port 90 under the bias of weight 96. Spring 84 is given a strength such that pressures on the order of 17 p.s.i. within vessel 12 (above atmospheric pressure) will move the steam 78 upwardly of FIG. 7 to expose the stem passage 80 to the atmosphere, while the weight 96 has a weight such that ball 94 will be lifted from its sealing relation with seat 92 when pressures within vessel 12 are on the order of 12 p.s.i. Stem seat 92, ball 90 and weight 96 form a valve device that is generally indicated at 91, which valve device is opened as part of the cooking process by a timer mechanism 103 that operates to lift weight 96 from ball 90 after predetermined time as set by manipulating its dial 105.

Regulator 72 includes swing or rocker arm device 98 that is pivotally connected to the valve body 94 and is provided with cam surfaces 99 forwardly and rearwardly of the regulator that are formed to cooperate with the top surface 100 of cover 50 to permit the operator to manually lift the stem 78 sufficiently to expose its passage 80 to the atmosphere for manually venting the vessel 12 through valve 87.

The valve body structure 74 is formed as indicated at 102 to direct all fluid pressure discharged from the vessel through the valve 91 rearwardly of the cabinet 16 and thus away from the position where the operator would normally stand.

Associated with the cover 50 is a splash shield structure 104 that is anchored to the cover by a yoke 106 and is formed to define at the rear of the cabinet 16 a discharge opening 108 (see FIG. 4) from which fluids under pressure are discharged away from the operator in the event that seal 52 should fail or cam lock devices 63 were actuated to release the cover 50 prematurely.

The hinge structure 48 includes a lost motion arrangement upwardly of the vessel 22 such that when the cam lock devices 63 are moved to their released positions, the cover will move from the level position of FIG. 4 to the dashed line inclined position shown in the same figure in which the seal 52 at the rear of the vessel 12 is freed from sealing engagement with the wall surface 21 thereof, which permits fluids under pressure to escape rearwardly of the cabinet 16 under the guiding action of the splash shield 104. In the form shown, the cover at its rear end is biased upwardly by springs 107 (see FIGS. 9 and 10) acting on its hinge pin 109.

The cabinet 16 in the embodiment illustrated includes an operating panel surface 110 that includes a thermostat control knob 112 cooperating with an indicator marking 113 that serves as an off-on switch and a means of controlling the amount of heat supplied by the heater device 36 (see FIG. 3), which is in the form of three band type heating devices 114, 116 and 118 operably associated with theromstat device 120 (see FIG. 12), the control knob 112 being appropriately marked for indicating a moderate heat supply warm up position and a high heat supply cooking range position in accordance with the heat supply requirements that are indicated hereinafter.

The panel 100 also includes two way off-on switch device 122 which is incorporated together with the thermostat control in a suitable electrical system to connect all of the heating band devices 114, 116 and 118 to a suitable source of power in one position of switch 122 thereof, while shutting off the source of power in the opposed position there. Panel 110 also includes an indicator light indicated at 124 which is wired to light when the heater device 36 is electrically actuated. The circuiting employed for heater device 36 is made such, in any suitable manner, that when control knob 112 is moved from the "off" position, and switch 122 is in the "recover" position (see FIG. 5), the three heat band devices are energized, but are de-energized by thermostat device 120 operating a suitable switch (not shown) when the temperature of the fat reaches about 375 degrees F.; the control knob 112 when positioned in the 'warm up" position, on the other hand, insures that heater device 36 will initially warm up the fryer at a lower heat supplying rate and keep it warm until use is intended, while its "cooking" position effects full heat output of heater device 36. Operating handle 30 for operating drain valve 26 also protrudes through the operating panel surface 110. The normal position for the operator to stand is in front of panel surface 110.

Figure 16:
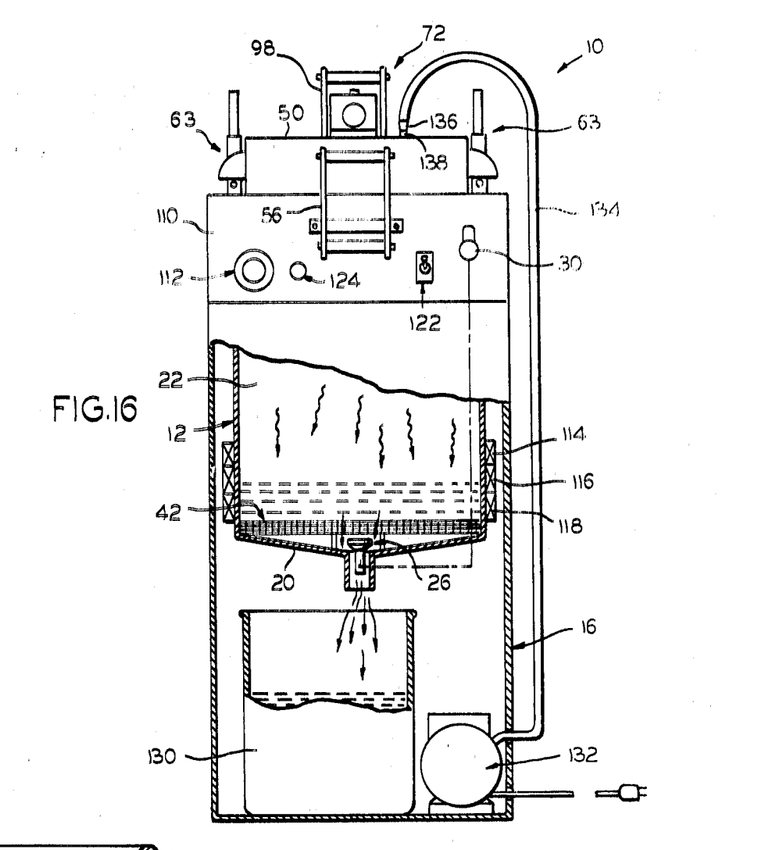
FIG. 16 is a diagrammatic view of the fryer shown in FIGS. 1–15 illustrating the manner and how the cooking oil is drained from the cooking chamber under pressure and through the filter unit for purposes of filtering out solids in the cooking oil for subsequent use of the cooking oil.

Cabinet 16 in the form shown is provided with a container 130 into which cooking oil from the vessel 12 is drained. As is made hereinafter clear, in accordance with this invention, the cooking oil is drained under pressure through filter unit 42 (see FIG. 16), and to achieve this end, cabinet 16 is provided with an air compressor unit 132 of any suitable type that includes a suitable conduit 134 provided with an end fitting 136 of any suitable type adapted for securement to a fitting 138 applied to cover 50 through which air may be supplied under pressure to vessel 12 when the cooking oil is to be removed therefrom. Air compressor 132 is actuated by suitable operation off-on switch 139, conduit 141 leading to the motor of compressor unit 132.

In accordance with this invention, the vessel 12 and basket unit 38 are proportioned such that chicken, when divided into the customary cooking segments, is cooked in a suitable cooking oil or fat contained within chamber 22 in the ratio of one pound of chicken to about two pounds of cooking oil. In the specific embodiment illustrated, the vessel and basket unit are designed such that when the basket 12 is fully loaded, about ten pounds of chicken will be cooked in about twenty-one pounds of cooking oil, with the vessel being about 60 percent full when only the cooking oil is contained in same.

OPERATION

In operation, the operator charges vessel 12 with cooking oil in the usual manner, drain handle 30 having been prepositioned (FIG. 1) to position the valve 26 in its closed position.

Figures 9, 10, 10A, 11:
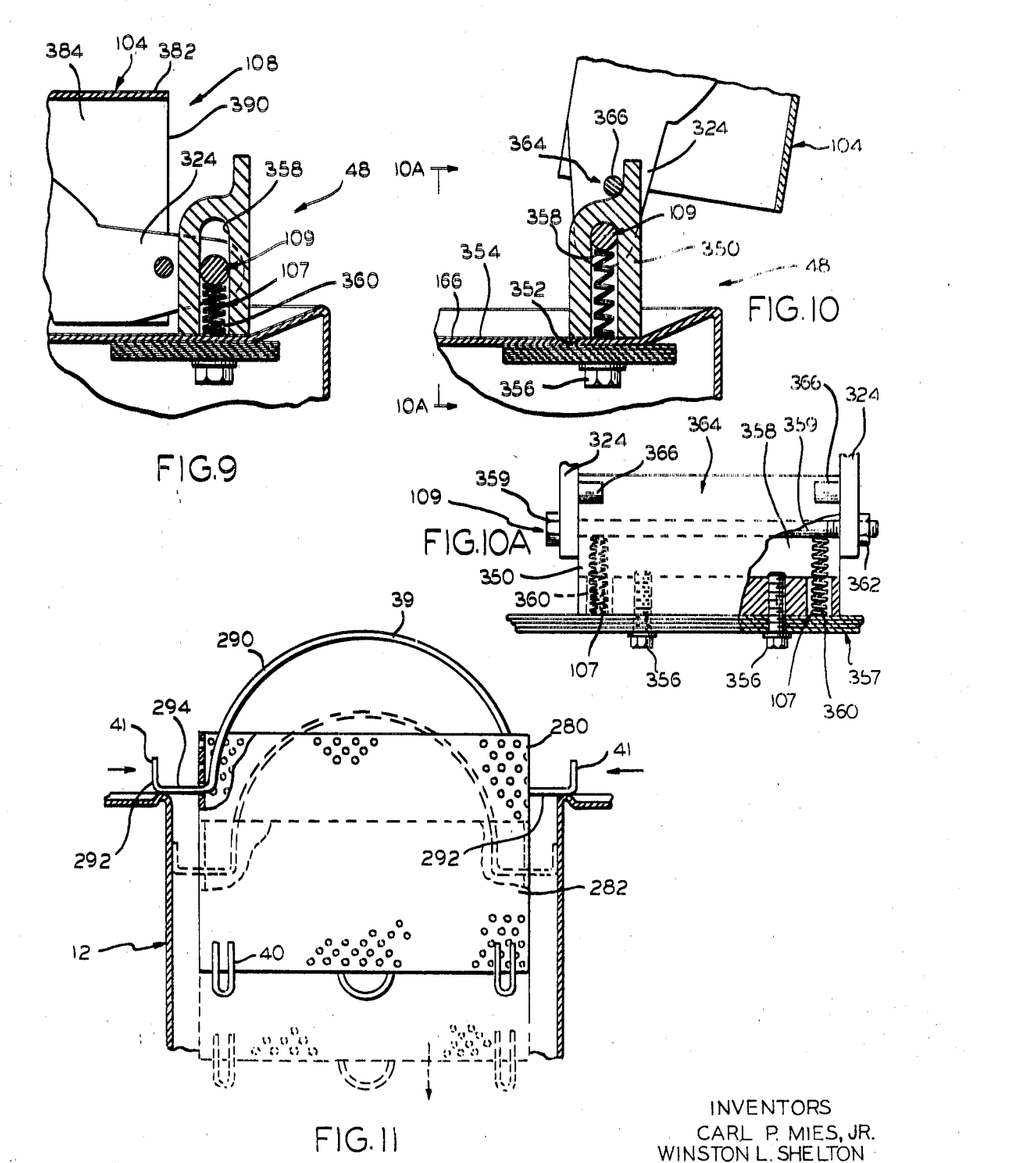
FIG. 9 is a diagrammatic fragmental view illustrating the lost motion hinge construction employed in connection with this invention, with the cover being shown in its fully clamped down position.
FIG. 10 is a view similar to that of FIG. 9 but illustrating the position the cover takes in its fully open position.
FIG. 10A is a fragmental view taken substantially along line 10A—10A of FIG. 10.
FIG. 11 is a diagrammatic vertical sectional view through the fryer cooking chamber illustrating the manner in which the chicken receiving basket cooperates therewith.

With the cover in its open position of FIGS. 5 and 10, the switch 122 is moved to its "recover" position, and control knob 112 is moved from the "off" position to the warm up position, which supplies sufficient heat to partially heat up the fryer and keep it warm until it is to be used. When use is desired, knob 112 is moved to the "cooking" position. The band heaters 114, 116, 118 which as indicated in FIG. 3 are entirely without the internal surface 21 of vessel 12, and are disposed above the and filler unit 42, heat up and supply heat to the vessel 12 and through its wall 18 to heat up the oil until the temperature of the oil is approximately 375 degrees F., whereupon thermostat 120 operates to shut off the heating device 36, as will be indicated by the turning off of indicator lamp 124. The arrangement is preferably such that there will be sufficient heat radiating and being conducted from heater device 36 so that the cooking oil will heat up to about 400 degrees F.

Figure 17:
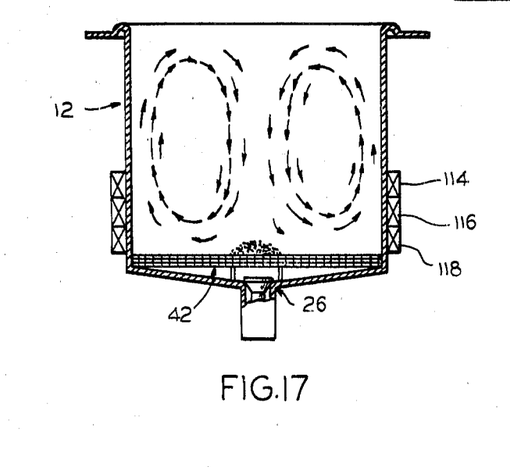
FIG. 17 is a diagram of the fryer cooking chamber illustrating the convection current flow of the oil bath within the cooking chamber.

The positioning of the heater device 36 adjacent the lower portion of vessel and about same establishes the annular convection current flow pattern in the heating oil that is indicated in FIG. 17, wherein hotter cooking oil adjacent the surface 21 of vessel 12 raises upwardly and at the top of the vessel moves toward the center of same where it tends to move downwardly toward filter device 42 and then toward the vessel surface for reheating.

Assuming that the swing arm device 98 of the regulator 72 is positioned to close valve 87, and that a basket 38 has been loaded with the chicken to be cooked, the basket is grasped by grasping its handle 39 and is lowered into the vessel 12 (with its handle ends 41 retracted into the basket), to the position where its legs 40 rest on the bottom of the vessel 12 with the cover remaining open; the chicken is cooked for several minutes until it has a color similar to that of cornflakes, as can be determined by visual observation (as by temporarily removing one or two pieces for inspection purposes). The cover 50 is then swung to its initial closed position (approximately the broken line position of FIG. 4), wherein the cover 50 is sufficiently canted with respect to the vessel by the biasing action of springs 107 acting on the cover hinge pin 109, that the swing arm 56 of catch device 54 may be disposed under the catch plate 60 by swinging same downwardly to the catch device 54, and then pulling the front end of the cover downwardly as required to clear the front edge of plate 60, after which the swing arms 62 are swung upwardly to cam the cover 50 into the fully closed position that is shown in FIGS. 2–4.

The hand operating dial 105 of timer mechanism 103 is set to allow about a 12 minute operating time before the timer mechanism operates to lift weight 96 off of ball 94 insofar as regulator 72 is concerned, to release the pressure build up within vessel 12.

Thereafter, the cooking of the chicken proceeds, the moisture from the chicken parts creating steam pressure to place the vessel in the desired pressurized condition. As a result of the chicken and basket being put into the fryer, the temperature of the oil will quickly drop to about 300 degrees F., but the residual heat in the device 36 and the vessel wall 22 is such that cooking proceeds through the browning and pressure cooking stages without having to supply more heat until the last few minutes of the cooking period set by operation of timer 103, when heat is supplied by thermostat device operating to automatically turn heater device 36 on as needed. In practice, the temperature of the cooking oil drops down to about 250 degrees F. during this cooking period. The heating oil convection flow pattern indicated in FIG. 17 continues, though substantially modified by the presence of the basket and chicken within vessel 12.

After the time interval that has been set on the timer has elapsed, the pressure regulator 72 operates to release the pressure within the vessel through valve 91, the sound of which will alert the operator that it is now time to open the cover 50. The swing arm 98 of the regulator is then operated (by swinging same toward or away from the operator) to move stem 78 of pressure regulator 72 (by camming either the forward or rearward set of cam surfaces 99 against cover surface 100) to release as much of the pressure as is reasonably practical from within the vessel whereupon the swing arms 62 of cam locks 63 are swung away from each other to release the sides of the cover; thereupon the biasing springs 107 of the hinge device 48 move the cover to its inclined partially opened position indicated in FIG. 4, to fully release excess pressure with vessel 12, whereupon the swing arm 56 of catch device 54 is pulled downwardly to clear the forward edge of plate 60 and is swung upwardly to release the front of the cover 50 for movement to the full open position of FIG. 5. The handle 39 of basket 38 may then be grasped by the operator to lift the basket 38 upwardly sufficiently to dispose the retractable ends 41 of the handle 39 above the top of vessel 12, which permits them to spring outwardly, in accordance with this invention, so that they can serve to hold the basket 38 in the temporary position shown in FIG. 5 which permits the oil to drain from the basket and the chicken contained therein.

After draining, the basket 38 may be removed to remove the chicken therefrom for refilling. During the chicken removal period, switch 122 and control knob 112 may remain in their "recover" and "cook" positions, respectively.

A new load of chicken parts may then be applied to and cooked in the fryer 10 in the manner indicated without draining off the cooking fat, thermostat device 120 automatically switching the heater device 36 into connection with its power source to again heat the cooking oil up to 400 degrees F., as before, and prior to application of the fresh chicken into vessel 12. When immediate chicken requirements have been supplied, knob 112 is moved to the "warm up" position to maintain the fryer at level of temperature suitable for ready return to full operation in the manner indicated. Movement of switch 122 and knob 112 to their "off" positions shuts down the fryer.

The arrangement of this invention is such that a number of batches of chicken may be consecutively cooked in the same cooking oil without changing the cooking oil, and even when this is done, the oil is merely filtered and then returned to the vessel with sufficient make-up oil to restore the original volume to the chicken versus cooking oil ratio that has been previously indicated.

This end is achieved for a number of reasons, as for instance, the smooth contour of vessel wall 21 and the lack of any recesses or projections into the chamber 22 from same, leave no places for solids to become lodged so that they will char, and the operation of the fryer is such that the cooking oil is not subject to high heat for any longer than necessary, which avoids premature break down of the oil. Furthermore, the convection flow pattern of the oil during the heat up period tends to move solids toward the cooler central portion of the oil charge so that they will tend to drop onto the filter device 42 and thus settle out of the hotter oil in which the cooking is done, whereby charring of solids is materially avoided. As experience has shown that for deep fat cooking from the standpoint of taste, appearance and digestability the fatty acid content should be maintained in the .13 to .27 percent by volume range, and charring of food solids is known to significantly increase the fatty acid content of cooking oils, the minimizing of charring achieved by this invention is an important factor in permitting repeated use of the same cookng oil without adversely affecting the quality of the cooked product.

Experience has shown that ordinarily six batches can be safely cooked in the same cooking oil using the hereindisclosed invention, in terms of providing a high quality product that is free of digestive problems. After the six batches of chicken, or when the operator by inspection observes that the cooking oil should be filtered, the knob 112 is moved to the "off" position, the cover 50 is clamped in its fully closed position, valve 87 is closed, the timer mechanism is reset to zero (to make valve 91 of regulator 72 operative), compressor 132 is connected to fitting 138 by applying fitting 136 thereto, switch 139 is actuated to turn on the compressor motor, and air under pressure is supplied to the sealed off vessel 12 up to the point where it starts escaping through regulator 72. The operator then operates handle 30 of linkage mechanism 28 to opening valve 26 (by moving same downwardly), which moves valve 26 to its open position, thereby permitting the pressure within vessel 112 to force the cooking oil therein through the filter unit 42 and out through port or drain opening 24 and into container 130. The filtering of the oil through filter unit 42 under the high pressure conditions indicated effects a drying of the solids collecting on top of the filter unit, which makes for ready and easy removal of same from the fryer by applying the hooked end 140 of a suitable implement 142 to the handle 43 of the filter device to remove the filtered out solids and filter unit as a whole from the vessel 12.

The filter unit may now be cleaned off and replaced within the vessel 12 to the position of FIG. 3, whereupon the filtered cooking fat may be returned to the vessel and supplemented by new cooking fat up to the original volume indicated. The cooking of the next six or so chicken batches may proceed in the manner previously indicated, whereupon the cooking oil is again filtered and replenished for cooking of a like number of chicken batches. This may proceed, using essentially the same cooking oil charge as replenished, until it becomes apparent from appearance that the cooking oil has reached break down point that cannot be sufficiently diluted by the addition of make up shortening.

It will thus be seen that this invention provides a deep fat fryer which not only reduces cooking judgment to a minimum, but also involves a safe, complication-free, and inexpensively manufactured cooker.

Furthermore, the invention provides a consistently high quality product at low cooking pressures with multiple use of the same cooking oil.

As indicated, the controls of the cooker are few and simple, and the operator is fully protected from being exposed to escaping fluids under pressure, which are directed rearwardly of the cooker and away from the normal station of the operator.

SPECIFIC DESCRIPTION

While the general arrangement that is illustrated in some detail has been found to provide highly satisfactory operation on a commercial basis, and thus is a preferred arrangement, the specifics involved may be varied within the usual ranges of competence of those working in the art to achieve the objectives of the invention. The invention also involves a number of specific improvements which will be dealt with in the specific description as follows:

VESSEL

As indicated, vessel 12 is of smooth walled construction and the heat supplying source is located exteriorly of cooking chamber 22. There are no protuberances, indentations, or ledges, etc. in the side wall of the vessel on which or in which solids could accumulate and char during the cooking process. This plus the tendency of the solids to settle out at the relatively cool location of the filter device, the periodic filtering of the cooking oil, and the adding of the make-up oil after filtering results in the fatty acid content of the cooking oil being kept within the desired range of between .13 and .27 percent by volume for a substantial number of uses of the same cooking oil charge.

The vessel 12 may be made from any suitable material that is suitably formed as a one-piece construction to define the side wall 18 and the bottom wall 20 that defines opening 150 which has affixed thereto a sleeve 152 within which valve member 26 operates.

The vessel 12 at its upper end defines a curved rim 154 that is continuous about the circumference of the vessel and defines an inwardly converging cam surface 156 for insuring that the cover seal 52 is guided into effective sealing relation with the vessel internal wall surface 21.

HOUSING AND CABINET STRUCTURE

The housing structure 14 for vessel 12 as a matter of practice may be of any suitable type, that illustrated comprising a suitable base structure 160 supported by side panels 162 that are connected by bolts 164 to a top panel structure 166 that encompasses the upper end of the vessel and forms the top portion of the cabinet 16. The bolts 164 are received in anchor blocks 168 that pivotally mount the swing arms 62 of cam locks 63, as will be hereinafter described in detail. Top panel structure 166 defines a skirt 169, the portion of which that is at the front of the fryer defining panel surface 110. At the front and rear of the vessel 12, front and rear panels 167 and 169 are suitably applied, which, together with side panels 162, define the space 171 about the vessel in which the heater device 36 is mounted, which may also include suitable heat insulating materials.

The side wall structure 170 of the cabinet 16 may take any suitable form of construction to complete the cabinet 16, including a floor 172, a door 174 hinged to the side wall construction 170 by suitable piano type hinge 176, a rear wall 177, and suitable supporting wheels 178 or the like which in the form illustrated are caster wheels of any appropriate make.

The rim 154 of the vessel 12 is welded to the top panel structure continuously thereabout, whereby the space 171 about vessel is kept free of cooking oil leakage.

Top wall structure 166 is attached to the side wall structure 170 by appropriate screws 178.

VESSEL DRAIN VALVE ARRANGEMENT

Drain valve 26 comprises a stem portion 190 (FIG. 3) and a head portion 192 which is recessed as at edge 194 to receive a suitable O-ring seal element (not shown) that is in sealing relation with sleeve 152 of vessel 12 in the closed position of valve member 26.

The valve member stem portion 190 is coupled by pin 198 to operating lever 200 of operating linkage 28, which is suitably hinged where indicated at 202, as by receiving the end portion 204 of anchor member 206 that is suitably secured to the housing structure 14, with the lever member 200 being held in place by suitable screw device 208.

Also operably associated with the valve 26 is a tubular spout member 210 that is likewise coupled to lever member 200 by the pin 198 for movement therewith. Tubular spout 210 is proportioned to slidably engage and substantially complement the external surface 212 of the vessel sleeve 152. The tubular spout 210 thus moves vertically with the valve 26 as lever member 200 is operated, lever 200 being excised as at 213 to permit the consequent relative movement between spout 210 and lever 200.

The lever member 200 at its end 214 is received through an opening 216 in a lever member 218 pivotally connected to the housing 14 by suitable pin 220. Lever member 218 at its end 222 is pivotally connected by suitable pin 224 to actuating arm 226 to which operating handle 30 is connected by suitable pin 228.

Figure 1:
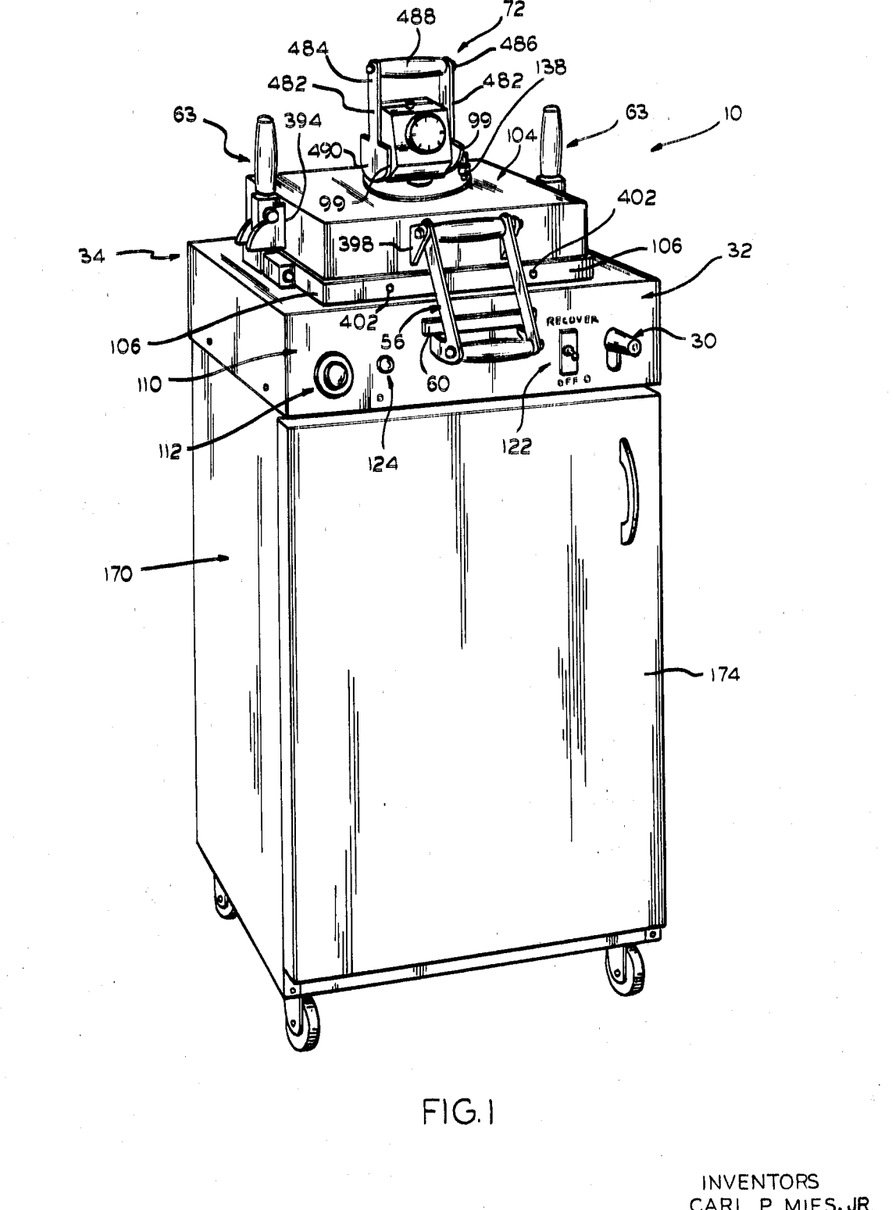
FIG. 1 is a perspective view of one embodiment of the fryer, showing same in condition for cooking under pressure.

Thus, when the operator pushes the handle 30 from the position of FIG. 1 to the position of FIG. 2, the operating linkage 28 is operated to raise valve member 26 from the full line sealing position shown in FIG. 3 to an open or draining position above same, while upward movement of the handle 30 returns the valve member 26 to the full line sealing position of FIG. 3.

THE HEATING ARRANGEMENT

Figures 12, 13, 14, 15:
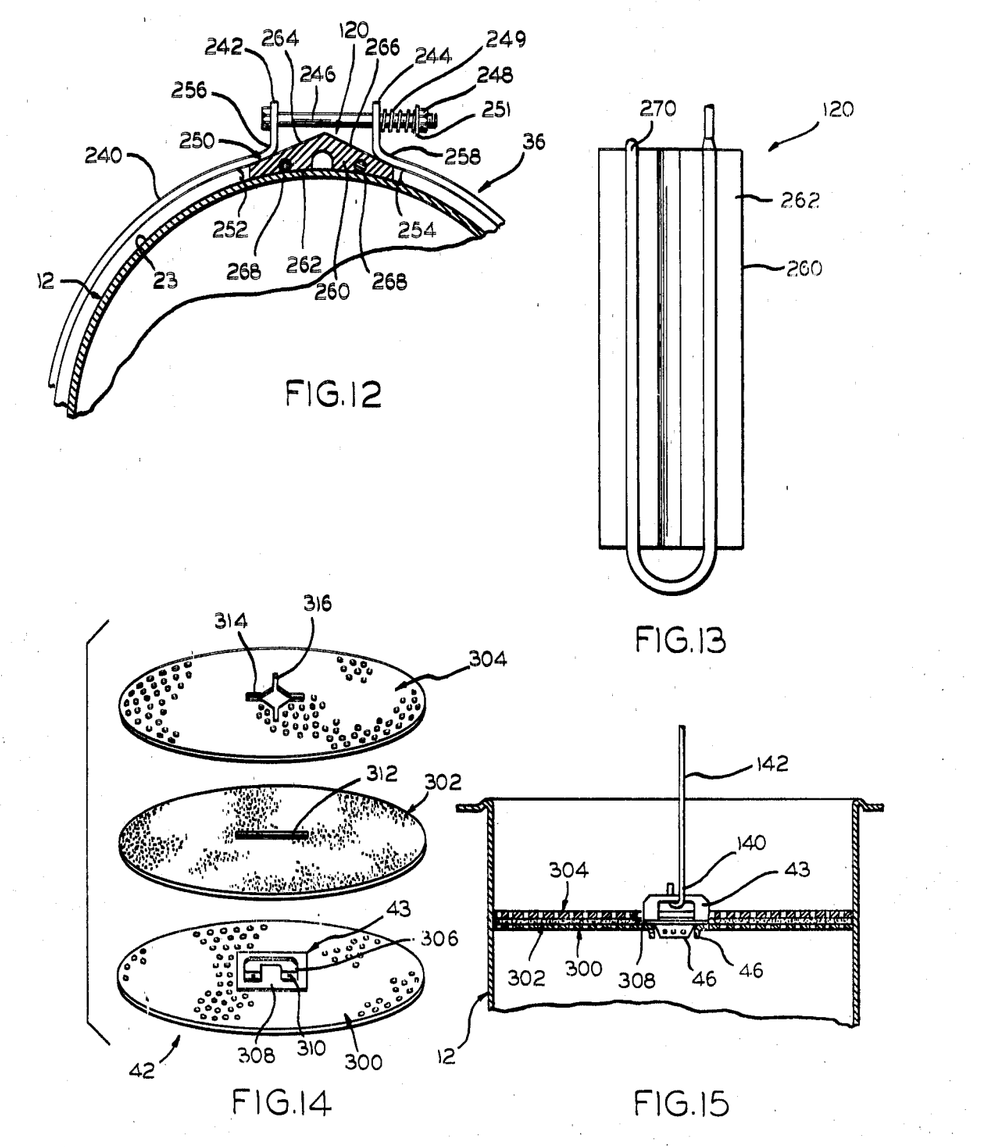
FIG. 12 is a horizontal sectional view taken substantially along line 12—12 of FIG. 3 illustrating the manner in which the heater bands and thermostat are applied to the fryer cooking vessel.
FIG. 13 is an elevational view of the thermostat device shown in FIG. 12 looking at the side thereof that engages the cooking vessel.
FIG. 14 is an exploded perspective view of the filter unit employed in the fryer.
FIG. 15 is a diagrammatic vertical sectional view through the cooking chamber illustrating the manner in which the filter unit is applied to and removed from the cooking chamber.

The band type heating devices 114, 116 and 118 may be of any suitable type, but are preferably secured in place in operative association with thermostat 120 in the manner suggested by FIG. 12, in which each band heater device is clamped in position by a band member 240 having its opposite ends 242 and 244 angled to receive one or more tightening bolts 246, tension being applied to the respective bands 240 by threading the nut 248 on the respective bolts 246 against the respective compression springs 249 that are interposed between the respective band member ends 244 and washer 251.

As indicated in FIG. 12, the thermostat device 120 is interposed in the space 250 between the ends 252 and 254 of the respective heater bands, the bands 240 being proportioned to have their end portions 256 and 258 engage the thermostat device 120 in the manner indicated to clamp same firmly against the exterior surface 23 of the vessel 12.

The thermostat device 120 comprises a body member 260 having its side surface 262 proportioned to substantially complement the exterior surface of the vessel 12, and its side surfaces 264 and 266 angled for clamping cooperation with the band end portions 256 and 258.

The thermostat body member is recessed as at 268 to receive a conventional gaseous type thermostat bulb element 270 which is positioned to be in flush engagement with the exterior surface 23 of vessel 12 under the clamping action provided by the band clamps 240. The thermostat device 270 is connected in a conventional manner to a suitable type snap action switch for controlling the heat supply to band type heaters 114, 116 and 118 to simultaneously shut off the current supply to all three heaters 114 116 and 118 when the temperature of the cooking oil reaches about 375 degrees the heat then contained in the band type heaters providing a sufficient override to run the temperature of the heating oil up to approximately 400 degrees F. which conditions the heating oil to receive the chicken for cooking purposes, in accordance with this invention. As already indicated switch 122 shuts heater device 36 off independent of thermostat device 120 and this may be electrically arranged in any suitable manner.

Any suitable electrical control arrangement may be employed to give control knob 112 the functions indicated, such as a suitable variable resistor, etc.

THE BASKET

The chicken receiving basket 38 comprises a generally cylindrical member 280 formed of perforated metal to define an upstanding circular side wall 282 and a bottom wall 284 secured together in any suitable manner, as by welding. The legs 40 are suitably secured, as by welding to the basket side wall 282 in the positions indicated in FIG. 3 and are preferably three in number.

The basket handle 39, and especially its end portions 41, serve the special purpose that has already been indicated by having the handle portions 41 retractable for full insertion of the basket 38 into the vessel, and extensible upon removal of the basket, as indicated in FIG. 11, so that the basket can be rested temporarily at the top of the vessel to permit cooking oil to drain from the chicken back into the vessel. For this purpose, the handle 39 is in the form of a resiliently flexible wire element 290 shaped to define an open loop (see FIG. 11) and having its end portions 292 reversed to define rectilinear slide portions 294 which are slidably received through conveniently located perforations 296 formed at opposite sides of the basket side wall 282.

The end portions 41 of the handle 38, when the basket is to be inserted in the vessel, can be pressed inwardly of the basket to the dashed line position shown in FIG. 11, where they will fit down inside the vessel 12, so that the vessel can be lowered to the position shown in FIG. 3.

On withdrawal of the basket from vessel 12, the end portions 41 of handle 39, under the biasing action provided by the resilient wire structure forming the handle 39, automatically shift outwardly to the full line position shown in FIG. 11, so that the basket can be temporarily suspended in the manner indicated.

THE FILTER UNIT

The filter unit 42 generally comprises (see FIG. 14) a filter plate 300 provided with the handle structure 43, a sheet of filter paper 302 of any appropriate type, and a protector plate 304.

The members 300 and 304 may be formed of any suitable perforated metallic material, and handle structure 43 generally comprises a suitable handle member 306 affixed to a suitable base plate 308, as by welding at 310, which in turn is suitably affixed to filter plate 300 in any suitable manner as by spot welding.

As indicated in FIGS. 3 and 15, the plate 300 at its mid portion has fingers or projections 46 struck downwardly to support the filter unit at the mid portion thereof, base plate 308 overlying the void created by the struck down portions 46.

Filter paper member 302 seats directly on top of the filter plate 300, the filter paper member 302 being formed with a suitable slot 312 to receive handle 306.

The protector plate member 304 seats on top of filter paper 302 and is formed with cross slots 314 and 316 that are proportioned to alternately receive the handle 306.

As is previously indicated, the filter unit 42 in use is disposed at the bottom of vessel 12 resting on its rim portion 44. The heating arrangement 36 is positioned so that the filter unit 42 will be disposed below the lowermost band type heater 118 and thus in a relatively cool area of the vessel.

During the cooking operations, solids tend to deposit adjacent the mid portion of the filter unit 42 due to the special convection flow established by the heater device 36 (see FIG. 17).

On discharge of the cooking oil in accordance with the procedure heretofore described, the cooking oil is forced through the filter unit toward the port 24 and thus all of the solids in the cooking oil converge on and are caught by the filter unit 42 for ready removal by removing the filter unit in the manner indicated in FIG. 15.

THE COVER

The cover 50 is made from suitable heavy gauge metal having the general configuration indicated to define a dome like cover portion 320, a pair of forwardly extending lugs 322, a pair of rearwardly extending lugs 324, and the flanges 70 on either side of the cover portion 320.

At its mid portion, the cover 50 is formed to define a platform 326, the upper surface of which is hardened and made planar to define surface 100 that the cam surfaces 99 of the pressure regulator 72 cooperate with for manual release of pressure bypassing regulator valve 91.

Fitting 138 to which the air compressor 132 is connected is suitably mounted in the platform 326 for communication through the cover to the space enclosed by same, fitting 138 being provided with a suitable check valve arrangement (not shown) to normally block off fluid pressure escape through same except when overcome by air flow from compressor 132.

THE COVER FRONT CATCH DEVICE

The cover front catch device 54 in the form shown comprises swing arm 56 in the form of a pair of arm members 330 pivoted to the cover lugs 322 by suitable bolt 332 secured in place by appropriate cap nut 334. A handle element 336 interposed between the arm members 330 serves as the spacer as well as an aid to moving the cover 50 between its full open and full closed positions.

The arm members 330 are secured together at their outer ends by suitable bolt 338 secured in place by suitable cap nut 340, and have interposed between same handle 342 for conveniently manipulating the swing arm 56.

Arm members 330 are each formed with angled projections 344 each shaped to define a tooth 346 forming catch shoulders 58 that are shaped to swing under the catch plate 60 when the cover is in its partially opened, upwardly inclined position of FIG. 4.

The catch plate 60 comprises a suitable rigid element 348 formed to define along its lower edge 350 the downwardly inclined catch surface 352 that swing arm 56 cooperates with. Element 348 is affixed to the housing structure 14 in any suitable manner, as by employing screws 354.

It will be noted that the swing arm 56 of catch device 54 is biased by gravity to its locking relation with catch plate 60, although in the partially opened position of the cover under the biasing action of hinge 48, the swing arm 56 may be readily swung to its full open position.

LOST MOTION HINGE FOR COVER

Hinge 48 comprises a hinge block 350 formed to define a flat downwardly facing abutment surface 352 (see FIG. 10) which abuts against the upper surface 354 of housing structure top member 166, with the hinge block 350 being secured in place by suitable bolts 356 applied between same and the housing structure member 116 including a suitable reinforcement place structure 357.

The hinge block 350 is formed with a bore 358 that is dimensioned horizontally to substantially complement the diameter of hinge pin 109 that is applied between same and lugs 324 of the cover (for purposes of hinging the cover to the vessel), but which is dimensioned vertically somewhat in excess of double the diameter of pin 109 to provide the aforementioned lost motion which is illustrated by FIGS. 9 and 10. Hinge pin 109 is illustrated in the form of bolt 359 secured in place by cap nut 362.

Springs 107 which bias the hinge pin 109 to the position of FIG. 10 when the cam locks 63 are in their released positions are mounted within recesses 360 formed in hinge block 350.

The hinge block 350 is also shaped to define a stop seat 364 against which engage stop pins 366 that are carried by the cover plate lugs 324, for purposes of holding the cover in the upright position that is indicated in FIGS. 5 and 10.

THE COVER CAM LOCKS

The cam locks 63 each comprise a swing arm 62 hinged to the respective block elements 268 by suitable pins 370 and provided with a suitable gripping handle 372 for ease in operating same.

Figure 6:
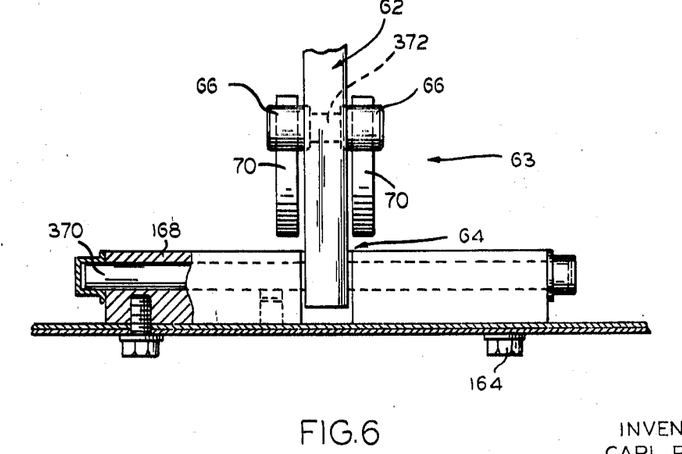
FIG. 6 is a fragmental view of one of the camming type cover clamps for locking the cover in its fully closed position.

The rollers 66 are the cam followers of the respective cam locks 63, and are journaled on suitable pins 372 (see FIG. 6) suitably mounted in the respective swing arms 62. As already indicated, rollers 66 ride on cam surfaces 68 of the respective cover flanges 70, which surfaces 68 are formed to define a flattened seat 374 onto which the respective cam rollers 66 ride as swing arms 62 are moved to their vertical cover locking positions.

SPLASH SHIELD FOR COVER

Splash shield 104 comprises a sheet metal member 380 shaped to define a top 382, sides 384 and 386, and a front 388, with the rear being open as at 390 to define the discharge passage 108.

The shield 380 has its top 382 formed to seat on shoulder 392 of the cover platform 326 (see FIG. 4), and has its sides 384 and 386 slotted as at 394 and 396 (see FIGS. 1, 2 and 3), respectively to receive the respective cover flanges 70. The front of the shield member 380 is slotted as at 398 to receive the cover front lugs 322, shield member 380 being secured in place by three sided yoke 106 secured to same (by employing appropriate screws 402) under the respective cover flanges 70 and lugs 322.

In the closed position of the cover, the lower edge 400 of the shield 104 is disposed below the upper rim 404 of housing structure 14, while at the rear of the fryer, the shield 104 is open across the entire rear of the cover.

THE PRESSURE REGULATOR

The pressure regulator device 72 serves the important functions of limiting pressure build up within the vessel 12, providing a timing arrangement for release of cooking pressures at the end of a predetermined cooking time that may be set by the operator, and providing for manual release of pressures within the vessel immediately prior to the operator opening the cover 50.

In addition to providing these functions, the pressure regulator is shaped to direct rearwardly of the operator's normal operating position at the front of the fryer, fluids under pressure that escape from within the vessel.

Figures 7, 7A, 7B, 8:
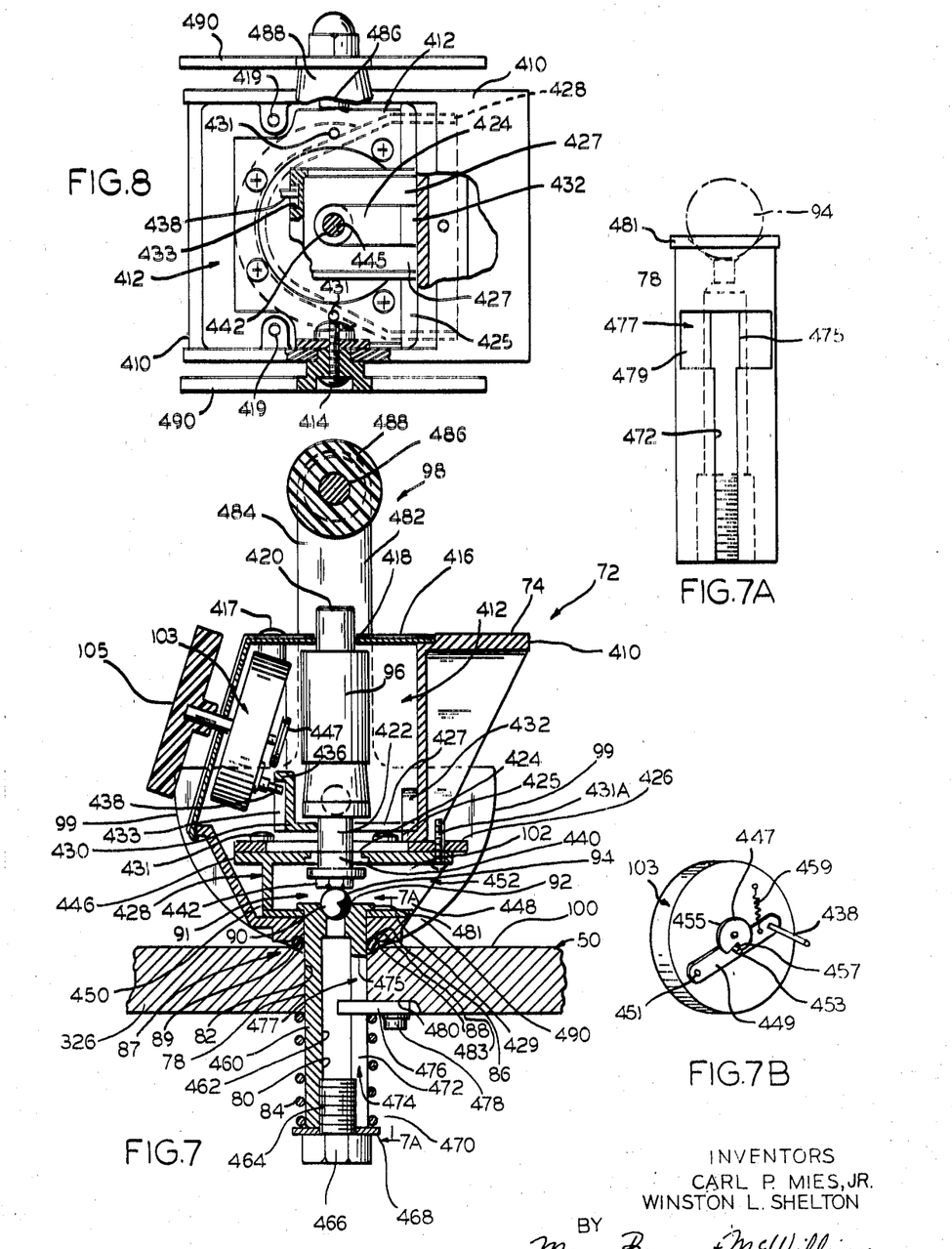
FIG. 7 is a sectional view through the pressure regulator employed in connection with the fryer on its cover, it being shown in the manner indicated in FIG. 4 but on an enlarged scale.
FIG. 7A is a detail view along line 7A—7A of FIG. 7.
FIG. 7B is a diagrammatic view of the timer employed in the regulator.
FIG. 8 is a plan view of the regulator shown in FIG. 7, with the regulator cover and timer removed and parts being broken away to expose other parts.

The pressure regulator body 74 generally comprises a housing 410 in which weight 96 is mounted in a timer compartment 412 thereof, with the swing arms 98 being pivotally secured thereto by appropriate mounting screws 414 (see FIG. 8). The compartment 412 is closed by suitable cover structure 416 (held in place by suitable screws 417 applied to housing holes 419) that is formed to define a suitable opening 418 through which the upper end 420 of the weight 96 extends. The lower end 422 of weight 96 engages a diaphragm 424 which is interposed between a diaphragm plate 426 secured to the housing and a partition structure 428 that is mounted within the housing 410 about the valve 91 and rests on a support plate 429, the partition structure 428 and support plate 429 being secured to the housing by suitable screws 431 and the diaphragm plate 426 being secured to partition structure 428 by suitable screws 431A.

The lower end 422 of the weight 96 also passes between the legs 427 of a forked lifter element 430, which legs 427 are disposed on either side of a projection 432 formed in housing 410 and rest on a ledge 425 of housing 410. The lifter element 430 at its rear side is recessed as at 433 to define a ledge 436 that is engaged by the stud 438 of conventional timer mechanism 103 when the latter is actuated by its own internal mechanism to lift the valve weight 96 upwardly of ball 94, the ledge 425 serving as a fulcrum for element 430.

The weight 96 at its lower end carries flanged spacer 440 secured to weight 96 by an appropriate bolt 442 cooperating with lock washer 443. The bolt 442 passes through opening 445 formed in diaphragm 424, the rim of diaphragm opening 445 being clamped between the lower end 422 of weight 96 and spacer 440. Bolt 442 rests on ball 94 cf valve 91. Diaphragm 424 is in the form of a neoprene coated nylon fabric material on the order of .012 inch thick.

The timer mechanism 103 effects rotation of its disc 447 in a conventional manner, stud 438 being mounted on lever 449 (see FIG. 7B) pivoted on the timer mechanism as at 451 and carrying pin 453 that rides on rim 455 of disc 447 and slips in slot 457 thereof under the action of tension spring 459 which acts to swing lever 449 to in turn swing element 430 upwardly and thus weight 96 as well at the end of the timing cycle.

The partition structure 428 comprises a top wall 446, spaced identical side walls 448 (only one of which is shown) on either side of the valve 91 that merge into a rounded forward wall 450 which faces the front side of the fryer when the regulator 72 is in its operative position on cover 50. The rear of the partition structure 428 is open as at 452 to direct fluids under pressure from valve 91 rearwardly of the fryer. Thus, the partition structure is received within housing 410 and defines a baffle arrangement that directs released fluids under pressure rearwardly. All openings, cracks and openings between housing 410 and the partition structure are sealed by application of a suitable sealing compound.

Stem 78 of regulator 72 comprises a suitable tubular element 460 formed to define a bore 462 which forms passageway 80. Bore 462 is internally threaded as at 464 to receive bolt 466 that supports washer 468 which forms a spring seat for the end 470 of compression spring 84.

The side wall of the stem 78 is slotted as at 472 to define an inlet port 474 leading to the passage 80 of stem 78 from the inner side of the cover 50. When the pressures under the cover 50 and within the vessel 12 are such that spring 84 is deflected to the point where the end 475 of slot 472 is disposed above O-ring seal 88, the slot end 475 forms a discharge port 477 whereby the internal pressures within the vessel are released.

As indicated in FIG. 7A, stem 78 is recessed across its slot 472, as indicated at 479, to better define the port 477.

Received within the slot 472 of the stem 78 below the recess 479 is a stop element 476 that is fixed to the cover 50 by a suitable screw 478. Stop element 476 is proportioned to substantially complement the width of slot 472 and is received within the locating recess 480 of cover 50. Element 476 maintains the stem 88 and the regulator 72 from rotating with respect to the cover 50, and serves as a stop limiting movement of the stem 78 outwardly of cover 50. Stem 78 adjacent its seat 92 is flanged as at 481 so as to engage against support plate 429, through which it extends, to resist the action of spring 84. The portion of housing 410 that stem 78 extends through is formed to define a hub portion 483 to better define seal seat 86.

The swing or rocker arm device 98 comprises a pair of arm members 482 having their ends 484 joined by a suitable bolt 486 carrying handle 488. The ends 490 of the respective arms 482 are given the generally arcuate configuration indicated to define the cam surfaces 99 on either side thereof.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:
1. A deep fat fryer comprising:
   a vessel defining a smoothed walled chamber proportioned to receive cooking oil and a food to be cooked in the approximate ratio of two to one,
   a drain opening at the bottom of said vessel,
   valve means for opening and closing said drain opening,
   a removable cover for closing off the top of said vessel,
   means for clamping said cover in closed relation to the vessel,
   heater means about said vessel and spaced above the bottom thereof for heating cooking oil received therein,
   said heater means being exterior of said chamber, and
   filter means between said heater means and said vessel bottom for filtering cooking oil drained from said vessel before it passes through said valve means.
2. The fryer set forth in claim 1 wherein:
   said filter means comprises a filter unit removable from the top of said vessel when said cover thereof is open, whereby solids in the cooking oil collecting on said filter unit on draining of the oil from said chamber may be removed from said chamber by lifting out said filter unit.
3. The fryer set forth in claim 1 including:
   means for supplying gas under pressure to said chamber for draining the oil from the vessel under fluid pressure conditions.
4. The fryer set forth in claim 1 wherein:
   said heater means comprises a plurality of sets of heater devices disposed in substantial superposed relation about said chambers and substantially encompassing same, and electrical circuit means for simultaneously energizing all said sets of heater devices for heating cooking oil in said chamber and for alternately energizing one of said heater device sets for cooking food in the heated oil.

5. The fryer set forth in claim 4 wherein:

said heater devices each comprise a band type heater, with the heaters of the respective sets having spaced apart end portions at a common location about the vessel, and thermostat means interposed between said heater end portions and in close physical contact with the vessel.

6. The fryer set forth in claim 1 including:

means for hinging said cover to said vessel at one edge portion of said cover, seal means for acting between said cover and said vessel on closure of said vessel to seal off said vessel on actuation of said clamping means, and catch means at the opposed edge portion of said cover for releasably securing same against opening movement, said hinging means including means for providing lost motion of said cover one edge portion upwardly of said chamber sufficiently to render said seal means ineffective, said clamping means including means for seating said cover in sealing relation with said vessel to render said sealing means effective, whereby, on release of said clamping means without release of said catch means, pressure in said chamber will take up said lost motion in said hinging means to break the seal established by said seal means without fully opening the cover.

7. The fryer set forth in claim 1 including:

basket means proportioned to substantially complement the internal horizontal cross sectional configuration of said chamber and adapted to receive the food to be cooked for immersion in the cooking oil, said basket including retractable laterally extending projections that retract on insertion of said basket means in the chamber and extend on withdrawal of said basket means therefrom whereby said basket means may be temporarily rested on top of the vessel to permit excess oil to drain therefrom.

8. The fryer set forth in claim 1 including:

splash shield means overlying said cover, said fryer having a front side and a rear side, switch means located at said front side of said fryer for controlling said heater means, said splash shield means being formed to deflect emission from said chamber under pressure rearwardly of said fryer.

9. The fryer set forth in claim 1 including:

pressure regulator means for limiting pressure build up in said chamber, said regulator means comprising:

a stem member protruding through said cover and being formed to define a fluid conducting passage extending between the interior and exterior sides of said cover and defining an intake port at the interior side of said cover and a discharge port at the exterior side of said cover, said stem member being formed to define a valve seat in circumambient relation with said discharge port, a ball positioned to seat on said seat in sealing relation to said discharge port, a weight positioned to seat on said ball, means for guiding said weight for limited movement toward and away from said ball, said seat, said ball and said weight being oriented so that in the closed position of said cover, said ball rests on said seat and said weight rests on said ball to provide valve means for limiting pressure build up in said chamber, and means including timer means for lifting said weight from said ball after a predetermined time to permit fluids under pressure to escape from said chamber through said passage.

10. The fryer set forth in claim 9 wherein:

said fryer has a front side and a rear side, and wherein said fryer includes switch means located at said front side of said fryer for controlling said heater means, said regulator means including baffle means directing escaping fluids under pressure rearwardly of said fryer.

11. The fryer set forth in claim 9 wherein:

said stem member is mounted in said cover for movement longitudinally thereof, and including:

seal means in circumambient relation about said stem member, means for resiliently biasing said regulator into sealing relation with said seal means, said stem member passage being formed to define a fluids discharge port that moves out of sealing relation with said seal means on a predetermined pressure being generated in said chamber.

12. The fryer set forth in claim 11 wherein:

said fryer includes cam means operably connected to said regulator stem member for mechanically moving said regulator out of sealing relation with said sealing means to expose the second mentioned fluids discharge port against the action of said resilient means.

13. The fryer set forth in claim 1 including:

pressure regulator means for limiting pressure build up in said chamber, said regulator means comprising:

a stem member protruding through said cover and being formed to define a fluid conducting passage extending between the interior and exterior sides of said cover and defining an intake port at the interior side of said cover and a discharge port at the exterior side of said cover, said stem member being formed to define a valve seat in circumambient relation with said discharge port, a ball positioned to seat on said seat in sealing relation to said discharge port, a weight positioned to seat on said ball, means for guiding said weight for limited movement toward and away from said ball, said seat, said ball and said weight being oriented so that in the closed position of said cover, said ball rests on said seat and said weight rests on said ball to provide valve means for limiting pressure build up in said chamber.

14. The fryer set forth in claim 13 wherein:

said stem member is mounted in said cover for movement longitudinally thereof, and including:

seal means in circumambient relation about said stem member, means for resiliently biasing said regulator into sealing relation with said seal means, said stem member passage being formed to define a fluids discharge port that moves out of sealing relation with said seal means on a predetermined pressure being generated in said chamber.

15. The fryer set forth in claim 14 wherein:

said fryer includes cam means operably connected to said regulator stem member for mechanically moving said regulator out of sealing relation with said sealing means to expose the second mentioned fluids discharge port against the action of said resilient means.

16. The fryer set forth in claim 13 wherein:

said fryer has a front side and a rear side, and wherein said fryer includes switch means located at said front side of said fryer for controlling said heater means, said regulator means including baffle means directing escaping fluids under pressure rearwardly of said fryer.

17. A deep fat fryer comprising:
a vessel defining a smoothed walled generally cylindrical chamber proportioned to receive cooking oil and a food to be cooked in the approximate ratio of two to one,
a drain opening at the bottom of said vessel,
said vessel bottom being formed to define a funneling portion at the lower end of said chamber leading to said drain opening,
valve means for opening and closing said drain opening,
a removable cover for closing off the top of said vessel,
means for clamping said cover in closed relation to the vessel,
heater means about said vessel and spaced from the bottom thereof for heating cooking oil received therein,
said heater means being exterior of said chamber,
and filter means between said heater means and said vessel funneling portion for filtering cooking oil drained from said vessel before it passes through said valve means,
said filter means comprising a filter unit removable from the top of said vessel when said cover thereof is open and proportioned to substantially complement the width of said chamber,
whereby solids in the cooking oil collecting on said filter unit on draining of the oil from said chamber may be removed from said chamber by lifting out said filter unit.

18. The fryer set forth in claim 17 wherein:
said filter unit comprises a lower perforated filter plate,
an upper perforated protector plate,
and a sheet of filtering medium interposed between said plates,
said filter unit defining one or more legs adapted to engage said vessel bottom adjacent said drain opening for bracing said filter unit,
said filter unit including handle means on the upwardly facing side thereof adjacent the mid-portion thereof adapted to be engaged by an implement for lifting said filter unit from said vessel.

19. The fryer set forth in claim 17 wherein:
said vessel includes a tubular element leading from said drain opening,
a valve member mounted in said tubular element for movement longitudinally of said tubular element between a retracted sealing relation therewith and an extended fluid flow permitting relation therewith,
means for reciprocating said valve member between said relations,
and a spout member slidably receiving said tubular element and movable with said valve member for conveying fluids from said tubular element.

20. In a pressure fryer including a vessel defining a cooking chamber having an upper open end, a safety cover arrangement for same comprising:
a cover,
means for hinging said cover to said vessel adjacent one edge portion of said cover for swinging movement upwardly of the vessel to open the upper end of said vessel,
catch means at the opposed edge portion of said cover for releasably securing same against opening movement,
clamping means on either side of said catch means for clamping said cover to said vessel to close off said open end thereof,
seal means for acting between said cover and said vessel on closure of said vessel to seal off said vessel on actuation of said clamping means,
said hinging means including means for providing, on release of said clamping means, sufficient lost motion of said cover one edge portion upwardly of said chamber to a position to render said seal means ineffective adjacent said cover one edge portion, on release of said clamping means, while said catch means remains operative to secure said cover against opening movement,
means for resiliently biasing said cover edge portion to said position thereof,
said clamping means when operative to clamp said cover to said vessel seating said cover in sealing relation with said vessel against the action of said biasing means to render said sealing means effective about said cover,
whereby, on release of said clamping means without release of said catch means, said biasing means acts to take up said lost motion in said hinging means to break the seal established by said seal means without fully opening the cover, thereby providing release for excessive pressures in the vessel prior to releasing said catch means to open said vessel.

21. The safety cover arrangement set forth in claim 20 wherein:
said catch means includes means for maintaining same locked against release when said clamping means clamps said cover to said vessel, and for rendering said catch means operative but releasable in said position of said cover.

22. The safety cover arrangement set forth in claim 20 including:
a splash shield overlying said cover,
said splash shield being formed to deflect emission under pressure from said chamber in the direction of said cover one edge portion.

23. A deep fat fryer comprising:
a vessel defining a smoothed walled generally cylindrical chamber adapted to receive cooking oil and a food to be cooked,
a drain opening at the bottom of said vessel,
said vessel bottom being formed to define a funneling portion at the lower end of said chamber leading to said drain opening,
valve means for opening and closing said drain opening,
a removable cover for closing off the top of said vessel,
means for clamping said cover in closed relation to the vessel,
heater means about said vessel and spaced from the bottom thereof for heating cooking oil received therein,
said heater means being exterior of said chamber,
filter means between said heater means and said vessel funneling portion for filtering cooking oil drained from said vessel before it passes through said valve means,
said filter means comprising a filter unit removable from the top of said vessel when said cover thereof is open and proportioned to substantially complement the width of said chamber, and
means for supplying gas under pressure to said chamber for draining the oil from the vessel through said filter means and said drain opening and valve means,
whereby solids in the cooking oil collect on said filter unit on draining of the oil from said chamber and may be removed from said chamber as a unit by lifting out said filter unit.

24. The fryer set forth in claim 23 wherein:
said filter unit comprises a lower perforated filter plate,
an upper perforated protector plate, and
a sheet of filtering medium interposed between said plates,
said filter unit defining one or more legs adapted to engage said vessel bottom adjacent said drain opening for bracing said filter unit,
said filter unit including handle means on the upwardly facing side thereof adjacent the mid-portion thereof adapted to be engaged by an implement for lifting said filter unit from said vessel.

References Cited

UNITED STATES PATENTS

| | | | |
|---|---|---|---|
| 2,125,862 | 8/1938 | Ratcliff | 99—408 |
| 2,338,964 | 1/1944 | Pappas | 99—408 |
| 2,477,404 | 7/1949 | Butt | 210—489 X |
| 2,528,776 | 11/1950 | Pappas | 99—411 |
| 2,827,379 | 3/1958 | Phelan | 99—107 |
| 2,914,063 | 11/1959 | Wagner | 126—381 |
| 2,938,648 | 5/1960 | Phelan et al. | 99—403 UX |
| 3,107,601 | 10/1963 | Longmire | 99—330 |
| 3,194,662 | 7/1965 | Nelson | 99—330 UX |
| 3,259,521 | 7/1966 | Crall | 99—330 UX |
| 3,410,199 | 11/1968 | Quednau | 99—403 |
| 2,652,767 | 9/1953 | Childs | 99—408 |
| 2,716,938 | 9/1955 | Smith | 99—408 |
| 2,760,641 | 8/1956 | Mies et al. | 210—489 X |

FOREIGN PATENTS

| | | | |
|---|---|---|---|
| 668,613 | 3/1952 | Great Britain | 99—408 |
| 622,425 | 6/1961 | Canada | 99—408 |

BILLY J. WILHITE, Primary Examiner

U.S. Cl. X.R.

99—107, 342, 408, 410; 137—624.12; 210—489, DIG. 8; 219—311; 220—55 PC